Dec. 6, 1960  F. H. FRANTZ  2,963,635
ALTITUDE CONTROL SERVOSYSTEM FOR AUTOMATIC
PILOT CONTROLLED DEVICE
Filed June 4, 1956  3 Sheets-Sheet 1

SECTION A-A

INVENTOR.
FREDERICK H. FRANTZ
BY

INVENTOR
FREDERICK H. FRANTZ

Dec. 6, 1960  F. H. FRANTZ  2,963,635
ALTITUDE CONTROL SERVOSYSTEM FOR AUTOMATIC
PILOT CONTROLLED DEVICE

Filed June 4, 1956  3 Sheets-Sheet 3

INVENTOR
FREDERICK H. FRANTZ
BY
ATTORNEY

United States Patent Office 2,963,635
Patented Dec. 6, 1960

2,963,635

ALTITUDE CONTROL SERVOSYSTEM FOR AUTOMATIC PILOT CONTROLLED DEVICE

Frederick H. Frantz, Binghamton, N.Y., assignor to General Aniline & Film Corporation, New York, N.Y., a corporation of Delaware Filed June 4, 1956, Ser. No. 589,092

7 Claims. (Cl. 318—481)

This invention relates to aircraft control apparatus and particularly to automatic pilot systems for maintaining level flight of the craft at a predetermined altitude.

It is desirable in the automatic piloting of an aircraft to provide means whereby the altitude is held substantially constant over a certain flight period. Although automatic pilots will tend to maintain level flight, slight changes in the attitude of the plane due to either external influences, such as vertical air movements, or internal causes, such as shifting of weight in the direction of the longitudinal axis of the plane, will result in a slow change of altitude normally not sensed by the automatic pilot.

Altitude controls of various types have been proposed which operate from pressure-sensitive devices and directly or indirectly effect the actuation of attitude-controlling surfaces, such as elevators of the plane. In most cases, such prior art apparatus has been found complicated and cumbersome, representing additional weight and space requirements difficult to accommodate except in large planes. These requirements generally represent costly installations not feasible for smaller aircraft.

The present invention has for its object to provide a simple, light-weight apparatus which, in combination with an automatic pilot having at least a pitch axis control, will maintain level flight at a constant altitude.

It is a particular feature of this invention that the altitude control of the aircraft is superimposed upon the pitch axis altitude control of the automatic pilot, thereby eliminating duplication of parts.

A further object of the invention is to provide a barometric sensing apparatus of simple construction and an electric pick-off therefor which can be disengaged at will.

Essentially, the invention comprises two component elements combined with an automatic pilot of the plane and, in particular, the gyro vertical thereof. The first element is a barometric sensing device which operates electric circuit closure means upon changes of altitude, i.e., barometric pressure. The closure means may be disconnected at the will of the operator at any particular altitude, or put into actuation so as to cover a range of altitudes from a chosen reference level.

The second component element is an electromotive actuator which is positionable in two alternate positions upon closure of the electric circuit by the barometric sensing device. The electromotive actuator is the link between the barometric element and the automatic pilot of the plane and functions to position, by way of example, the sensing element of the gyro which, in turn, controls the elevators of the plane for either higher or lower altitude flying.

Other objects and features will be apparent from the following description of the invention, pointed out in particularity in the appended claims and taken in connection with the accompanying drawings in which:

Figure 1:
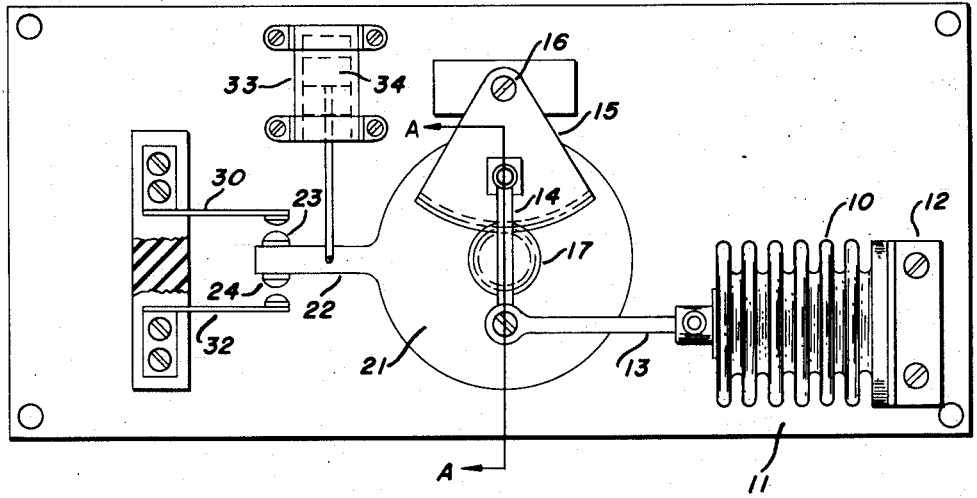
Fig. 1 is a front elevational view of the barometric sensing element.
Figure 2:
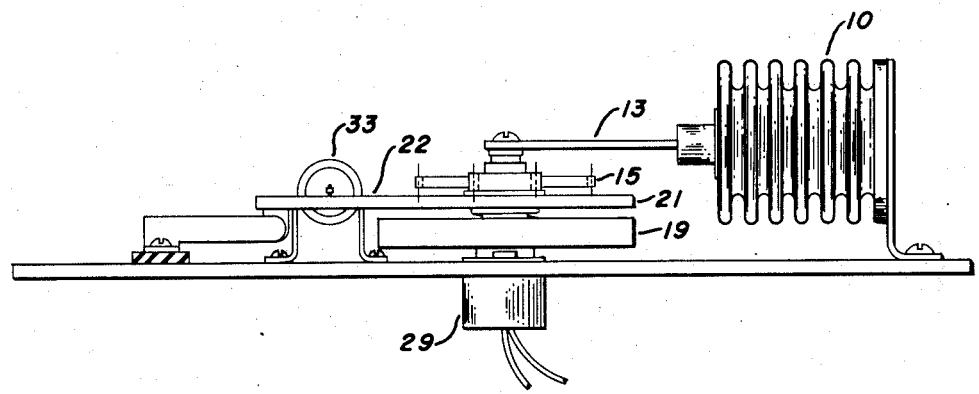
Fig. 2 is a side view thereof.
Figure 3:
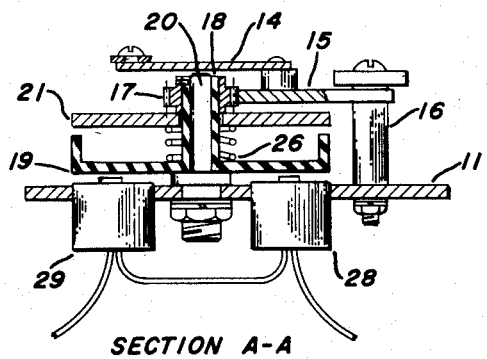
Fig. 3 represents a section of Fig. 1 along lines A—A.

Referring to Figs. 1, 2 and 3, the altitude-sensing or barometric device comprises an evacuated bellows 10 affixed to a base plate 11 by means of a bracket 12. The bellows 10 which responds to pressure variations is provided with a rod 13 pivotally connected to another rod 14 which is affixed radially at the mid-point of a sector gear 15 rotatably supported over a stud 16. In mesh with the sector gear 15 is the pinion 17 affixed to the hub 18 of the disc 19 which freely rides on a stud 20 attached to the base plate 11. Fitted over the hub 18, so that it may rotate freely thereon, is a second disc 21 having a radially extending finger 22 equipped on both sides with electrical contacts 23 and 24, respectively. A coil spring 26 around the hub 18 separates the discs 19 and 21.

Supported on the base plate 11 are two electromagnets 28 and 29, each facing the disc 19 and displaced in diametrically opposed positions, performing the function of an electromagnetic clutch to engage the freely supported disc 21, which is of ferromagnetic material, with the sector gear actuated disc 19 as will be more fully described later.

Attached to the base plate, and insulated therefrom, are also contact springs 31 and 32, so spaced as to cooperate with the contacts 23 and 24 of the finger 22, respectively. Since as previously stated, the disc 21 may rotate freely upon the hub 18 and thereby engage either one of the contacts, it is necessary to dampen the movement thereof. For this purpose, there is provided a dash pot 33 secured to the base plate 11 and having its plunger 34 connected to the finger 22.

Figure 4:
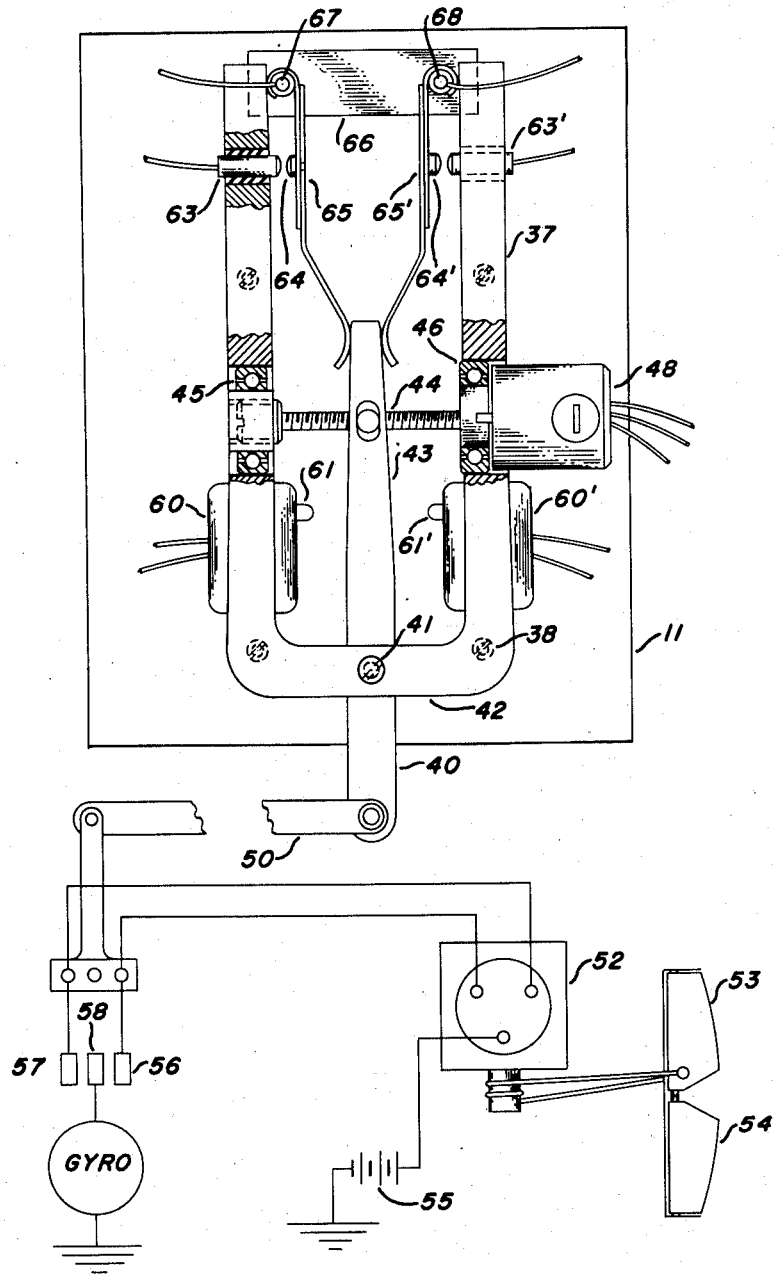
Fig. 4 is a front elevational view of the electromotive actuator functionally connected to a gyro-controlled elevator mechanism of the plane, the latter being schematically illustrated.

Referring to Fig. 4, the electromotive actuator, which is the link between the barometric sensing element and the automatic pilot, comprises a U-shaped frame member 37 which may be mounted by means of bolts 38 on the same base plate 11 on which the barometric sensing element is located. However, it may also be mounted in a position remote from the barometric element, preferably on or near the automatic pilot mechanism of the aircraft since it is physically interconnected therewith, as will be described later.

An actuator lever 40 is fulcrumed in a pinion 41 located in the horizontal portion 42 of the frame member 37. The arm 43 of the lever 40 extends upwardly and has a transverse running thread which accommodates the lead screw 44. The latter is journalled in the sides of the U-shaped frame member 37 in suitable bearings 45 and 46 and is arranged to be rotated by the motor 48 which may be coupled to the lead screw 44 in any desired manner. The direction of movement of the actuator lever 40 around the pivot 41 toward one or the other of the upright portions of the U-shaped member depends on the direction of rotation of the motor 48.

The purpose of the lever 40 is primarily to effect displacement of suitable control elements in an automatic pilot so as to cause the aircraft to change its attitude and either to ascend or descend as the case may be. In the illustration in Fig. 4, the automatic pilot portion is schematically represented since it forms no part of the present invention.

The actuator lever 40 may be connected to various types of automatic pilots, and with any particular component thereof, as long as the pivotal displacement of the lever 40 is sufficient to move the controls of the pilot for change of altitude.

As shown in Fig. 4, the lever arm 40 is connected, by means of a link member 50, to a contact positioning element of the gyro which controls the automatic pilot for movement of the craft around its transverse or pitch axis. The latter may be described briefly as consisting of an actuator motor 52 adapted to move the elevators 53 and 54 in the proper direction for changing the attitude of the aircraft. The actuator motor 52 is operated from a power source shown here, by way of example, by the battery 55, and may rotate in one or the other direction depending upon which of the contacts 56 or 57 engages the gyro contact element 58.

Continuing with the description of Fig. 4, the upright portion of the lever arm 40, when displaced by the motor 48, operates electrical switches which control the motor 48 so as to stop the lever arm 43 at either end of its travel and to automatically return it to its mid-position when the proper altitude has been reached by the aircraft. The switches consist of a limit switch 60, located on the left upright portion of the U-shaped frame member 37, and a corresponding limit switch 60', located on the right upright portion of the U-shaped frame member. Both of these switches are shown here in the form of conventional microswitches having operating buttons 61 and 61', respectively, and are normally in closed position.

In the upper part of each portion of the U-shaped frame member 37 are placed reset switches 65 and 65' comprising electrical contactors 63 and 63', cooperating with spring contact members 64 and 64', respectively. These contact members engage the arm 43, one on each side, and are supported in the insulated cross member 66 over studs 67 and 68, respectively.

Figure 6:
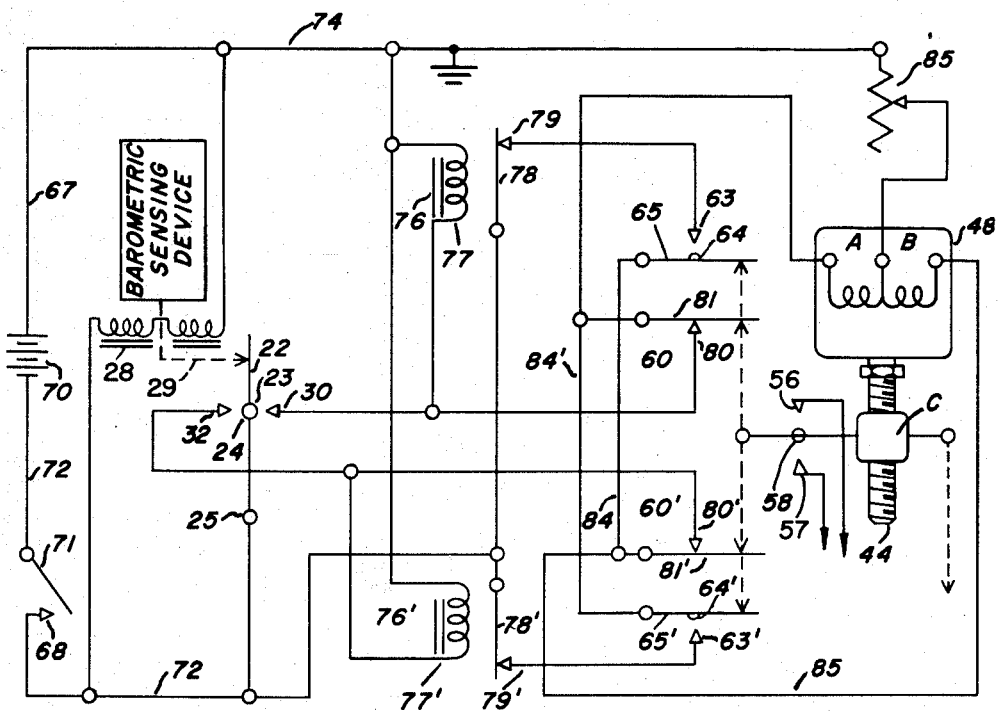
Fig. 6 is a schematic circuit diagram of the electrical connections between the barometric sensing device and the electromotive actuator.
Figure 5:
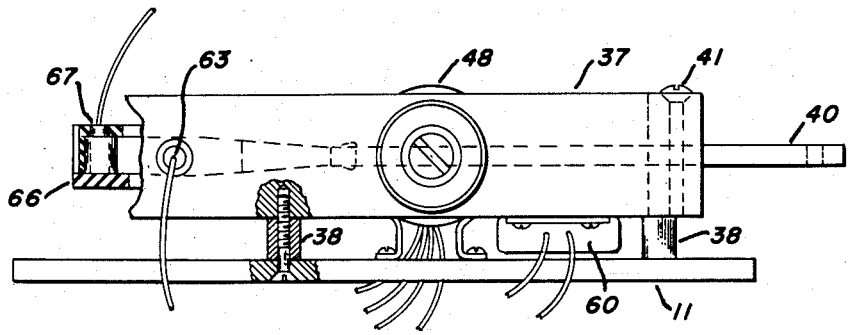
Fig. 5 is a side elevational view of Fig. 4.

The purpose and function of these switches can be more easily understood by referring to the circuit diagram in Fig. 6 depicting the interconnections between the switching element of the barometric sensing device and the electromotive actuator. The source of supply for the system is represented here by the battery 70 which may be the electrical power supply in the airplane or a separate battery if necessary. A main switch 71 is placed in series with the supply line 72 from one terminal of the battery 70. All current distribution in this circuit is taken from the supply line 72 as the high potential or "hot" line of the system, whereas the line 74, connected to the other terminal of the battery, represents the common or ground return side. The windings of electromagnets 28 and 29, which function, as shown in Fig. 3, to pull the disc 21 against the disc 19, are placed in series between the lines 72 and 74. When energized, the magnetic force generated will exert sufficient pull to hold the discs 19 and 21 against each other so that the rotary motion of the disc 19, due to expansion or construction of the bellows 10, is transmitted to the disc 21 whereby the contact finger 22 thereof may close either the contacts 24 and 32 in one direction of motion or, similarly, the contacts 23 and 31 in the other direction of motion.

In the circuit diagram of Fig. 6 the single-pole, double-throw switch 25 represents the action of disc 21 and the engaging contacts carry the same reference characters as those in Fig. 1.

Normally, when the disc 21 is free, i.e., when the electromagnets 28 and 29 are not energized, the movement of the bellows 10, transmitted through the sector gear 15, will rotate only the disc 19. The pressure sensitivity of the bellows is so proportioned that, at a given altitude, the sector gear 15 is at mid-point of its travel. This altitude may be chosen in accordance with the type of plane, and normally would represent 10,000 ft. The arcuate length of the rim of the sector gear 15 is so proportioned that, at sea level, when the bellows 10 is fully contracted, the gear 15 is near one end of its travel, whereas, near the other end, the maximum altitude would represent about 20,000 ft. above sea level. In whatever position the sector gear 15 may be, no motion is transmitted to the disc 21 until the magnets 28 and 29 are energized. The disc 21 is normally held between the contactors 31 and 32 and when the switch 71 is closed, so that the magnets 28 are energized, the neutral position of the disc 21 will remain undisturbed except that, from then on, it will respond to variations in movement caused by the bellows 10, starting from that altitude at which the switch 71 was closed.

Continuing with the description of Fig. 6, in reference to Fig. 1, let us assume that the switch 71 is closed and that the plane in flight lost altitude so that contraction of the bellows 10 causes the contacts 23 and 30 to engage. The circuit will now be completed by the switch 25, in one branch, to the winding 76 of the relay 77 which will open the contacts 78 and 79, in the second branch, to the field winding A of the motor 48 through the normally closed contacts 80 and 81 of the microswitch 60, causing the motor 48 to turn in the direction which will move the sleeve C riding on the lead screw 44 upwardly. (For the sake of simplicity of illustration, the sleeve C represents here the arm 43 of the lever 40, shown in Fig. 4.)

Upon a given distance of travel of the sleeve C, the contacts 80 and 81 of the limit switch 60 will open and, simultaneously, the contacts 63 and 64 of the reset switch 65 will close. The opening of the contacts 80 and 81 breaks the circuit of the field A so that the motor 48 stops. In this position, now considering Fig. 4, the lever 43 would be moved to the left and the button 61 of the microswitch would be depressed whereas contacts 63 and 64 of the reset switch 65 would be closed. The actuator arm 40 of the lever 43, on the other hand, would have moved to the right. This motion, transmitted through link 50 to the gyro contacts, will effect closure between contactors 56 and 58, causing the actuator motor 52 of the automatic pilot to move the elevators 53 and 54 in an appropriate direction to increase the altitude of the craft.

When the altitude is reached where the bellows 10 resets the switch 25 the relay 77 will be de-energized. This closes the contacts 78 and 79. The reset switch 65 having previously been closed by the movement of the sleeve C (e.g., the lever arm 43 in Fig. 4) will now complete the circuit to field B of the motor 48, so that it will rotate in a direction to position the lever arm 43 toward the center. When the center position is reached, contacts 63 and 64 of the reset switch 65 will open thus breaking the circuit to the motor 48.

The center positioning of arm 43 restores by virtue of the link member 50, the gyro contacts to normal position so that level flight is established.

It is to be remembered that the altitude control, in accordance with the present invention, is an auxiliary device for an autopilot and is particularly suitable for the type of pilots where the attitude control of the craft is effected by electromotive contact elements serving as direct pick-off of a gyro horizon or other gyroscopic device. It in no way interferes with the normal operation of the gyroscope except as to position the contacts thereof. The restoring of the attitude control elements, such as ailerons, will naturally be controlled also by the action of the gyro per se, so that an altitude change as determined by the barometric sensing element will be effected gradually by the control of the gyro as the tilt of the aircraft dictates.

A type of automatic pilot system, to which the altitude control of the present invention is particularly applicable, is shown in U.S. Patent 2,803,794. Referring to Fig. 15 thereof, the lever arm 40 would be tied in to position contacts 196 and 194 with respect to the center contact 190, thus effecting the automatic altitude control of the aircraft. In other types of systems, the lever arm 40 may initiate pneumatic, rotary or inductive couplings to alter the function of the control in accordance with the altitude sensing by the barometric element.

I claim:

1. In an automatic pilot for aircraft having a gyro vertical including bi-directionally movable electrical contact elements actuated thereby and electromotive means for effecting movement of altitude controlling surfaces of said aircraft in accordance with the direction of actuation of said contact elements, an automatic altitude control comprising barometric sensing means including bi-directionally movable electrical switching means actuated thereby, a circuit including a source of electrical energy connected to said switching means, a bi-directionally operable electromotive device energized from said circuit and means for effecting actuation of said contact elements upon energizing of said device in accordance with the direction of operation thereof, thereby effecting movement of said altitude controlling surfaces in accordance with the response of said barometric sensing means.

2. In an automatic pilot for aircraft having a gyro vertical including a pair of bi-directionally displaceable electrical contact elements actuated thereby and electromotive means for effecting movement of altitude controlling surfaces of said aircraft in accordance with the direction of displacement of said contact elements, an automatic altitude control comprising barometric sensing means including bi-directionally movable electrical switching means actuated thereby, a circuit including a source of electrical energy connected to said switching means, a bi-directionally operable electromotive device energized from said circuit and means for displacing said contact elements upon energizing of said device in accordance with the direction of operation thereof, thereby effecting movement of said altitude controlling surfaces in accordance with the response of said barometric sensing means.

3. Apparatus in accordance with claim 2 wherein said barometric sensing device comprises a pair of disc members coaxially placed on a common shaft, one of said discs being freely rotatable thereon and the other affixed thereto and rotatable therewith, an electrical contact arm carried by said first disc and placed between fixed contact elements, an aneroid bellows, means for transmitting the expanding and contracting motion thereof to corresponding rotary motion of said shaft and clutch means for coupling said discs whereby motion of said second disc due to atmospheric pressure changes is transmitted to said first disc for actuation of either one of said contacts.

4. Apparatus in accordance with claim 2 wherein said electromotive device comprises a lever arm fulcrumed in a frame member, the shorter end of said lever being interlinked with said gyro contact elements and the longer end extending between said frame members being mounted over a motor driven lead screw whereby said arm, upon one direction of rotation of said motor, is moved toward one of said frame members and, upon reversal of said motor toward the opposite frame member, limit switches for said motor determining the extent of displacement of said lever arm in any one direction and reset switches actuated by said arm for establishing a current path for said motor in said circuit for restoring said arm into intermediate position upon similar position being taken by the switching means of said barometric sensing device.

5. In a system for remote actuation of a lever between intermediate and one predetermined position in one direction of movement and between intermediate and another predetermined position on the opposite direction of movement in accordance with the position of a switch arm between neutral and opposite contact elements, an electrical circuit including a dual field winding electric motor operating said lever, a source of electrical current, a connection between said field windings to one terminal of said source, a pair of limit switches having normally closed contacts and a pair of reset switches having normally open contacts, said lever being adopted to open one of said limit switches and close one of said reset switches at one predetermined position and similarly open another of said limit switches and close another of said reset switches in the other predetermined position, said limit switches being in series between said windings and said contact elements, respectively, a pair of relays having normally closed contacts, said reset switches being in series between said windings, said relay contacts and the other terminal of said source, respectively, and said switch arm being connected to said last-mentioned terminal.

6. A system in accordance with claim 5 wherein said connection between said windings and one terminal of said source includes in series a variable resistance for controlling the speed of actuation of said lever.

7. A system in accordance with claim 5 wherein the energizing windings of said relays have one terminal each connected to one terminal of said source and the other terminal to one of the contact elements of said switch arm respectively, the last-mentioned connection being so selected that the relay having its contacts in series with the reset switch to be closed by said arm is energized upon closure of said switch arm.

References Cited in the file of this patent

UNITED STATES PATENTS

| | | |
|---|---|---|
| 2,474,618 | Divoll | June 28, 1949 |
| 2,512,902 | Rossire | June 27, 1950 |
| 2,552,196 | MacCallum et al. | May 8, 1951 |
| 2,646,946 | Newtin | July 28, 1953 |
| 2,657,350 | Rossire | Oct. 27, 1953 |
| 2,678,178 | MacCallum | May 11, 1954 |
| 2,729,780 | Miller et al. | Jan. 3, 1956 |
| 2,763,450 | Hanna et al. | Sept. 18, 1956 |